United States Patent [19]
Windall

[11] 3,796,372
[45] Mar. 12, 1974

[54] APPARATUS FOR REMOVING SLUDGE

[75] Inventor: Roy Sidney Windall, Seal, England

[73] Assignee: Carrier Engineering Company Limited, London, England

[22] Filed: May 2, 1972

[21] Appl. No.: 249,704

[30] Foreign Application Priority Data
May 12, 1971 Great Britain.................. 14,495/71

[52] U.S. Cl. .............................................. 239/124
[51] Int. Cl............................................. B05b 9/00
[58] Field of Search .................................... 239/124

[56] References Cited
UNITED STATES PATENTS
2,763,575 9/1956 Bede .............................. 239/124 X Primary Examiner—Lloyd L. King

[57] ABSTRACT

Sludge returned to a tank containing a metal pretreating solution, for example zinc phosphate, is continuously removed from the bottom of the tank by a pump at a rate which is in excess of the capacity of a clarifier device to effect separation of sludge from solution and is delivered to a centrifugal cleaner in which the sludge is concentrated to a flow rate within the capacity of the clarifier device to which the concentrate is delivered from the cleaner.

7 Claims, 5 Drawing Figures

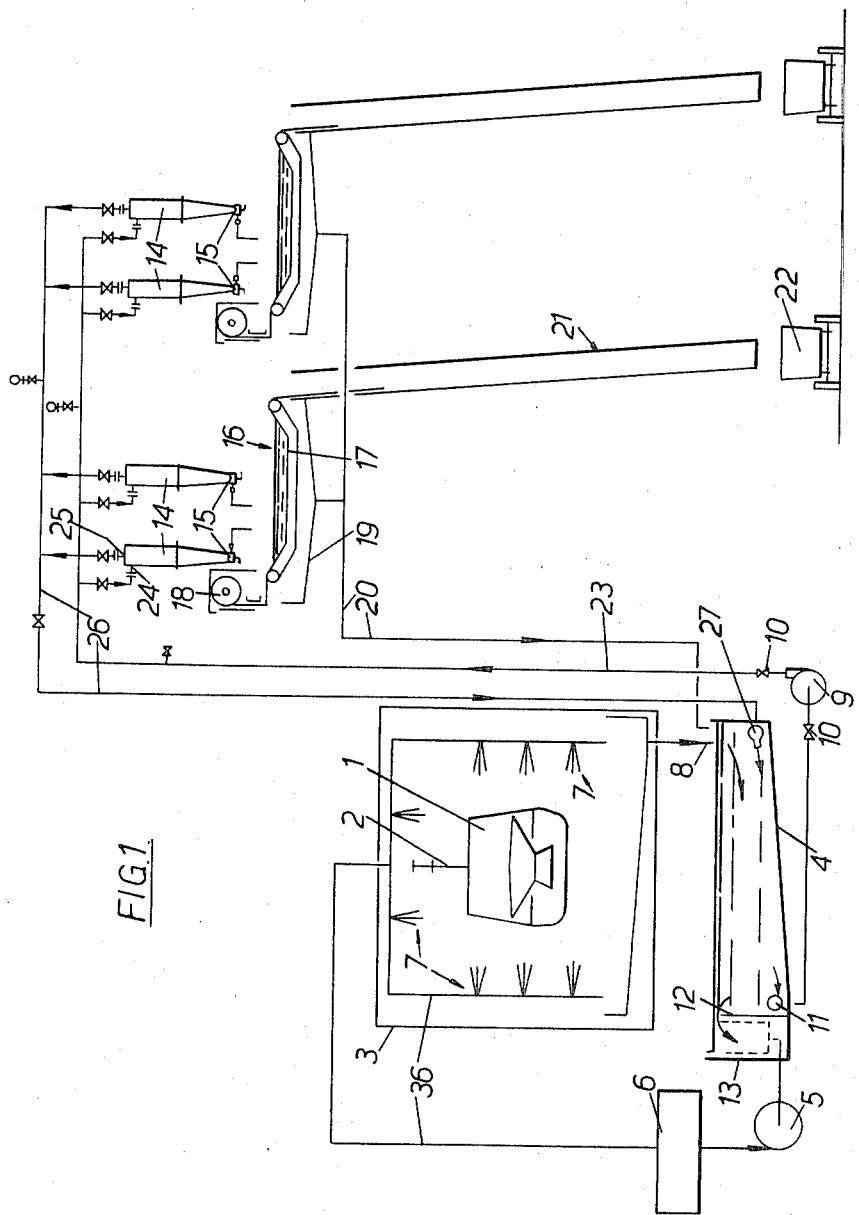

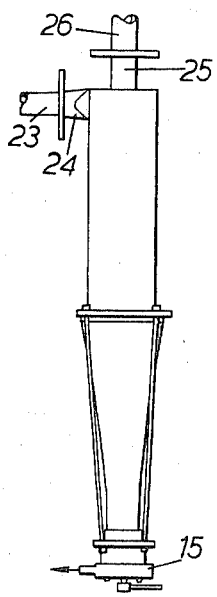
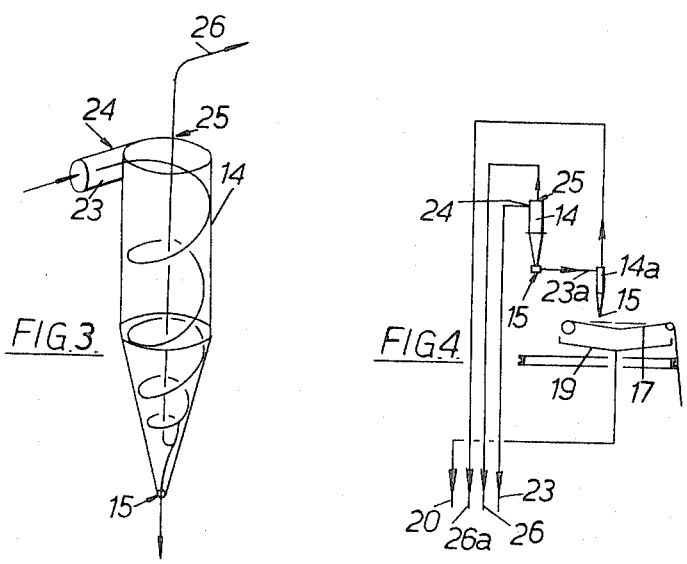

APPARATUS FOR REMOVING SLUDGE

BACKGROUND OF THE INVENTION

1. Field of the Invention

This invention relates to a method of removing sludge or other solid matter formed in solutions used in metal pre-treatment processes.

2. Description of the Prior Art

As is well understood metal which is to be painted or otherwise finish-coated is first subjected to one or more pre-treatment processes, to prepare the surfaces thereof to receive the paint or other finish-coating. One example of such pre-treatment is that applied to automobile bodies which, before, and usually as part of a continuous process, are subjected to spraying with or dipping into solutions for cleaning or surface treating the metal while being moved in succession through spray booths appropriate to the kind of cleansing or treatment at each cleansing or treatment stage. One of these stages is a zinc- or an iron-phosphating process which results in the production of sludge which is returned to a tank in which insoluble salts formed during the phosphating process settle to form sludge which must be removed from the tank, the solution from which the salts have settled being pumped again to the spray nozzles.

Heretofore one or other of three methods have usually been used to remove sludge from the tank, these methods being known as "manual de-sludging", "continuous de-sludging by vacuum or pressure-assisted filters", and "continuous de-sludging using sludge-settling cones to concentrate the sludge".

Manual de-sludging is generally only used in connection with plant for pre-treating small metal objects and consists of an operative entering the tank and manually digging out the sludge. This method entails stopping the treating process, is messy, is time consuming, and does not give a constant solution strength. When using this method solution is periodically pumped out of the phosphate tank into another tank before the operative enters the phosphate tank to dig out the sludge. The interval between cleanings of the phosphate tank may be from one to four weeks depending on the throughput of objects to be treated and for a plant having a very high rate of production even one week between cleaning operations may be too long. Because it is necessary to stop the plant during cleaning of the tank this operation is usually carried out during a week-end and for week-end working labour costs are high.

Continuous de-sludging by vacuum or pressure-assisted filters is a process which is satisfactory and this process entails pumping sludge at a low concentration from settling cones located under the phosphate tank and using vacuum or pressure-assisted filters to deal with the large volumes of liquid involved. In connection with large phosphate tanks sequencing controls may be used so that sludge is removed from each of the settling cones in rotation. This process is seldom used because the equipment necessary to carry it into effect is very expensive.

Continuous de-sludging using sludge-settling cones to concentrate the sludge is the method hitherto most commonly used and this method entails pumping sludge continuously from settling cones beneath the phosphate tank and over a clarifier which is a band filter made of filter paper which is drawn from a reel across a clean liquid collector and over a roller. Solution and sludge is pumped from the cones at a rate which is about equal to the capacity of the filter to effect filtering of the sludge from solution and the filtered solution drains through the filter paper into the collector from which it is returned to the phosphate tank and the sludge collects as a cake on the filter paper. The capacity of the filter is about 12 to 25 gallons per minute according to the size of the filter. The filter paper lies on the band filter in the form of a trough and when the thickness of the sludge on the paper is too great to allow liquid to run through the filter as fast as it is being supplied to the filter, the liquid level in the trough rises and operates a float switch which causes the band filter to run on and expose a fresh section of filter paper. The filter paper carrying collected sludge is collected in skips for removal and disposal thereof. Although this method has been that which hitherto has been the most commonly used it has the following disadvantages:

1. As the capacity of the band filter is restricted to about 20 gallons per minute the volume of flow of liquid and sludge from each settling cone is low and this leads to frequent blockages in the settling cones and the pipes from the cones to the filter. The use of pipes of smaller diameter in an effort to increase the velocity of liquid and sludge therethrough only leads to a greater tendency for the pipes to become blocked due to the restriction of the passages.

2. The only practical way of checking to detect blockages is for an operator to check the warmth of the sludge pipes beneath the settling cones. The phosphate solution is used hot, at a temperature of about 60°C so that by placing a hand on a sludge pipe just below the settling cone one can tell if the cone is blocked because if it is blocked the pipe will be cold. It is found that operators are usually unwilling to make the frequent checks necessary, such checks usually requiring to be made at least once an hour.

3. When a blockage is detected it is removed by passing compressed air into the pipes. This action cannot usually be carried out during production hours because the admission of the compressed air violently disturbs the sludge in the tank thus causing much of the sludge to enter the spray circuit where it may become deposited in heat exchanger tubes, block spray nozzles, and collect on an object being sprayed.

The present invention is concerned with improving the last described method and it is a main object of the invention so to improve that method as to reduce to a minimum the above-mentioned disadvantages thereof.

SUMMARY

According to one aspect of the invention there is provided in a process for pre-treating metal objects, for example a zinc-phosphating process, in which a treating solution is pumped from a tank to spray nozzles by which the solution is applied to the objects and is returned to the tank, and a mixture of sludge and solution is removed continuously from the bottom of the tank and is delivered to a clarifier device by which the sludge is separated from solution, the method of removing sludge which includes the steps of continuously transmitting sludge and solution from the tank at a rate in excess of that of the capacity of the clarifier device to effect separation of sludge from solution, and at a position between the tank and the clarifier device effecting concentration of the sludge to a flow rate thereof within the capacity of the clarifier device.

According to another aspect of the invention there is provided apparatus for pre-treating metal objects with a treating solution, for example with zinc-phosphate, comprising a tank to contain the solution, spray nozzles arranged to apply solution to the objects, a solution-pump operable to pump solution from the tank to the spray nozzles through solution-delivery pipes connecting the solution pump to the nozzles, a clarifier device operable to separate sludge from solution, a sludge-delivery pipe through which sludge and solution can pass from the bottom of the tank to the clarifier device, and a sludge-pump operable continuously to transmit sludge and solution from the bottom of the tank through the sludge-delivery pipe to the clarifier device, wherein a sludge-concentrating device connected to the sludge-delivery pipe is operable to concentrate sludge to a flow rate thereof within the capacity of the clarifier device and the sludge-pump is operable to transmit sludge and solution to the sludge-concentrating device at a rate in excess of that of the capacity of the clarifier device to effect separation of sludge from solution.

BRIEF DESCRIPTION OF THE DRAWINGS

FIG. 1 is a diagrammatic elevation of apparatus for carrying out the method according to the invention, FIG. 2 is a diagrammatic elevation of a sludge-concentrating device embodied in the apparatus of FIG. 1, FIG. 3 diagrammatically illustrates the mode of operation of the device of FIG. 2, and FIGS. 4 and 5 are diagrammatic elevations of modified forms of the apparatus shown in FIG. 1.

DESCRIPTION OF THE PREFERRED EMBODIMENTS

Figure 5:
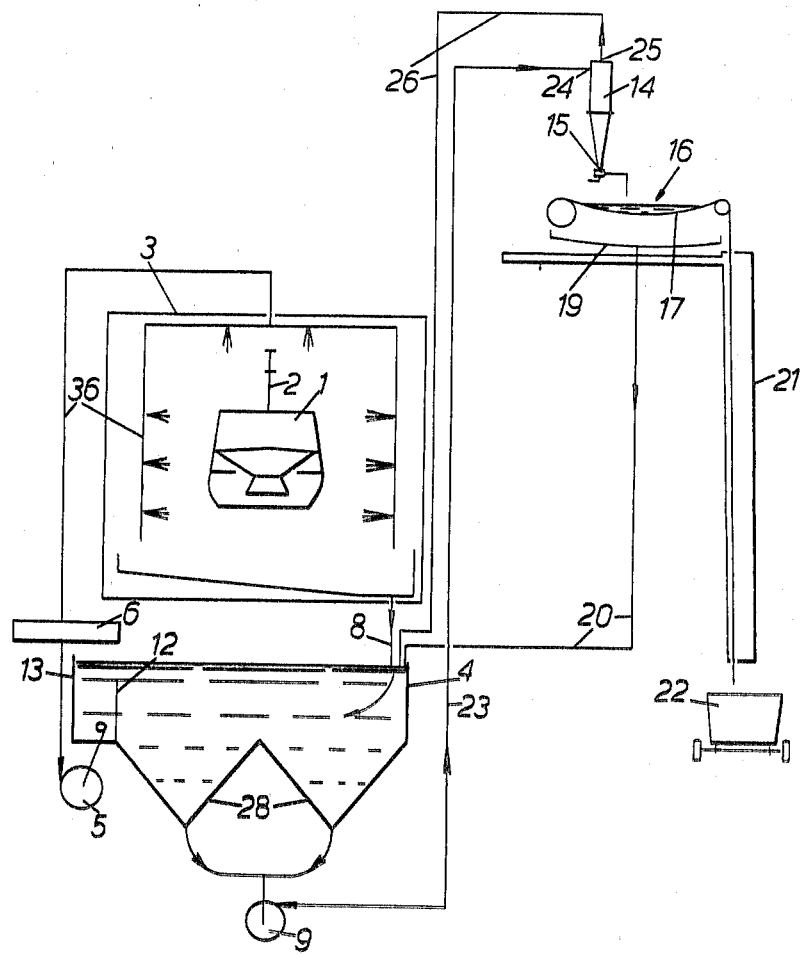

Referring to FIG. 1, metal objects 1 are, in known manner, moved in succession by a conveyor 2 through a pre-treatment compartment 3, which for the purpose of explanation is assumed to be a booth in which automobile bodies are subjected to a zinc phosphating process prior to painting. The zinc phosphate solution is contained in a tank 4, and a solution-pump 5 pumps the solution through a heater 6 and solution-delivery pipes 36 to spray means 7 which sprays the solution on to the bodies. The solution drains from the bodies and is returned to the tank, together with sludge, by a pipe 8. Sludge-containing solution which settles in the tank 4 is withdrawn therefrom by a suction sludge-pump 9 which is connected directly to the bottom of the tank 4 through pump-isolating valves 10 and a collector pipe 11. Solution substantially freed from sludge as the result of settling of the sludge passes over a weir 12 into the portion 13 of the tank to which the pump 5 is connected.

The pump 9 feeds sludge-containing solution from the tank to at least one sludge-concentrating device shown as a centrifugal cleaner 14 which is arranged to concentrate the sludge and to deliver the concentrated sludge through an outlet 15 from the cleaner 14 to a clarifier 16. The clarifier, which is of known construction, comprises a band 17 of filter paper which is drawn from reel 18 across a clean liquid container or trough 19 from which filtered liquid (solution) is returned by gravity through a pipe 20 to the tank 4. When the thickness of sludge on the band 17 is too great to allow liquid to run through the filter as fast as it is being supplied to the filter the liquid level in the trough rises and, in known manner, operates a float switch, not shown, which causes the band 17 to run on and expose a fresh section of the band. The band 17 carrying collected sludge moves downwards through a chute 21 and is collected in a skip 22 by which it is removed for disposal.

The outlet 15 may be an opening the size of which is predetermined to control the rate of delivery of sludge from the cleaner 14 according to the capacity of the band 17 to deal with the sludge delivered thereto or it may comprise an adjustable valve which can be adjusted to control the rate of delivery of sludge to the band 17. The outlet 15 is adjusted by the valve or by the use of alternative orifices of predetermined size so that the rate of delivery of sludge from the cleaner 14 is compatible with the capacity of the clarifier 16 to deal with the sludge delivered thereto. It will be understood that the size of the outlet 15 will also be set according to the anticipated quantity of sludge contained in the solution delivered to the cleaner 14 and will depend, among other things, on the quantity or concentration of sludge being fed to the cleaner, that is if the sludge is highly concentrated the outlet 15 will need to be larger because otherwise the cleaner may tend to become blocked, on the other hand if the sludge concentration is light a smaller outlet size can be used.

The mixture of sludge and solution is pumped continuously from the tank 4 and is delivered to the centrifugal cleaner 14 through a sludge-delivery pipe 23 at a rate which is in excess of that of the capacity of the band 17 to effect separation of sludge from solution. The sludge-containing solution enters the cleaner 14 at a position 24 near the top thereof and solution having a lower sludge concentration than the solution which entered the cleaner at position 24 leaves the cleaner at 25 from the top of the cleaner and is returned by a solution-return pipe 26 to a return header 27 in the tank 4. In one embodiment of the invention sludge-containing solution is pumped to the cleaner 14 at the rate of about 110 gallons per minute, concentrated sludge-containing solution is delivered to the clarifier at the rate of about 10 gallons per minute, and solution is returned from the cleaner to the tank 4 at the rate of about 100 gallons per minute.

In the event that one centrifugal cleaner and clarifier is not sufficient to deal with the sludge-containing solution pumped from the tank 4 the sludge-containing solution may be pumped to two or more cleaners 14 and thence either directly or via a further centrifugal cleaner to one or more clarifiers 16 as illustrated in FIG. 1.

The cleaner 14 is supported above the clarifier 16 and the latter is preferably supported on an elevated platform, not shown, with a gangway giving access to the platform for the purpose of servicing of the cleaner 14 and the clarifier 16.

FIG. 4 illustrates a modified embodiment of FIG. 1 in which concentration of sludge is effected in two stages by two centrifugal cleaners 14 and 14a. Partly concentrated sludge is delivered through a pipe 23a to the cleaner 14a and concentrated sludge is delivered from the cleaner 14a to the clarifier 16. Solution separated out in the cleaners 14, 14a is returned to the tank 4 by solution-return pipes 26, 26a.

FIG. 5 illustrates an embodiment of the invention as applied to an existing phosphating plant in which the tank 4 is provided with concentrating cones 28. In such existing plant the cones 28 and pump 9 are housed in a hole dug in the ground but when using the embodiment of FIG. 1 it is not necessary to dig a hole to accommodate any of the plant.

In all embodiments of the apparatus the piping is preferably made of stainless steel.

I claim:

1. Apparatus for pre-treating metal objects with a treating solution, for example with zinc-phosphate, comprising a tank to contain the solution, spray nozzles arranged to apply solution to the objects, a solution-pump operable to pump solution from the tank to the spray nozzles through solution-delivery pipes connecting the solution pump to the nozzles, a clarifier device operable to separate sludge from solution, a sludge-delivery pipe through which sludge and solution can pass from the bottom of the tank to the clarifier device, and a sludge-pump operable continuously to transmit sludge and solution from the bottom of the tank through the sludge-delivery pipe to the clarifier device, wherein a sludge-concentrating device connected to the sludge-delivery pipe is operable to concentrate sludge to a flow rate thereof within the capacity of the clarifier device and the sludge-pump is operable to transmit sludge and solution to the sludge-concentrating device at a rate in excess of that of the capacity of the clarifier device to effect separation of sludge from solution.

2. Apparatus according to claim 1, wherein the sludge-concentrating device is a centrifugal cleaner.

3. Apparatus according to claim 1, wherein a solution-return pipe connects the centrifugal cleaner to the tank to return to the tank solution which has had its sludge content reduced by the centrifugal cleaner.

4. Apparatus according to claim 2, wherein the rate of flow of sludge from the centrifugal cleaner is controlled by an outlet opening of predetermined size.

5. Apparatus according to claim 2, wherein the rate of flow of sludge from the centrifugal cleaner is controlled by an adjustable valve.

6. Apparatus according to claim 1, wherein the sludge-pump is connected directly to the bottom of the tank.

7. Apparatus according to claim 1, wherein the sludge-pump is connected to the bottom of the tank through at least one sludge settling cone.

* * * * *